United States Patent [19]
Kober

[11] 3,774,589
[45] Nov. 27, 1973

[54] SELF CONTAINED ELECTROCHEMICAL HEAT SOURCE
[75] Inventor: Frederick P. Kober, Bayside, N.Y.
[73] Assignee: Chem-E-Watt Corporation, Valley Stream, N.Y.
[22] Filed: Aug. 30, 1971
[21] Appl. No.: 175,846

[52] U.S. Cl............. 126/263, 44/3 A, 132/36.2 B, 136/86 A
[51] Int. Cl.............................. F24j 1/04, F24j 3/04
[58] Field of Search.................. 136/86 A, 111, 161; 126/263; 132/36.2 B; 44/3 R, 3 A, 3 C; 204/197; 219/224

[56] References Cited
UNITED STATES PATENTS
| | | | |
|---|---|---|---|
| 2,744,863 | 5/1956 | Andrus | 204/197 X |
| 3,260,661 | 7/1966 | Kemp et al. | 204/197 X |
| 3,207,149 | 9/1965 | Spindler | 126/263 |
| 3,589,945 | 6/1971 | Christopher et al. | 136/86 A |
| 3,307,997 | 3/1967 | Detrick | 126/363 X |
| 3,600,233 | 8/1971 | Coffey et al. | 136/166 X |
| 2,040,255 | 5/1936 | Gordon | 136/111 |
| 3,043,898 | 7/1962 | Miller et al. | 136/86 A |

FOREIGN PATENTS OR APPLICATIONS
478,101  10/1951  Canada............................ 29/196.1

OTHER PUBLICATIONS
A.P.C. Publication Serial No. 282,296 Marhenkel 5/11/1963.

Primary Examiner—A. B. Curtis
Attorney—Louis H. Reens

[57] ABSTRACT

An electrochemical heat source is described wherein an electrochemical cell is provided with an electrical shorting member which is connected to the anode and cathode electrodes of the cell to enable the electric energy of the cell to be dissipated as heat. A safe non-toxic electrochemical heater for hair waving, hot compresses and similar uses is described wherein an anode in the form of a foil of aluminum or aluminum alloys is spaced by a non-conductive separator from an air depolarized activated carbon electrode. An electrolyte of a solution of table salt is employed to activate the heater. Various configurations and sandwich structures are described.

10 Claims, 8 Drawing Figures

Patented Nov. 27, 1973  3,774,589
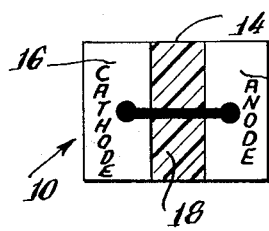
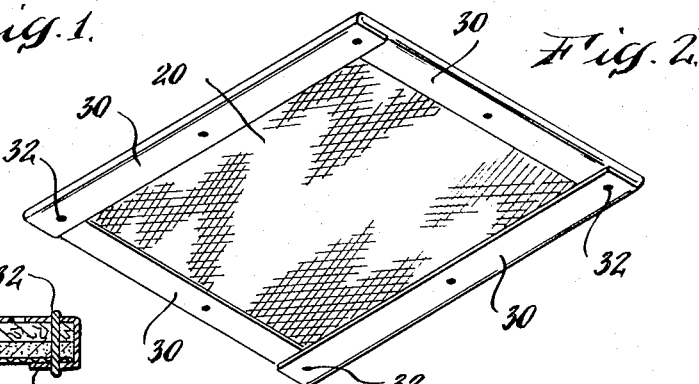
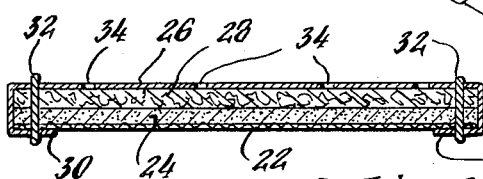
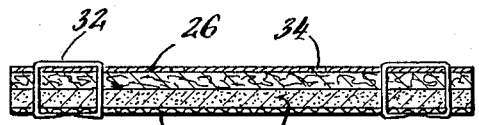
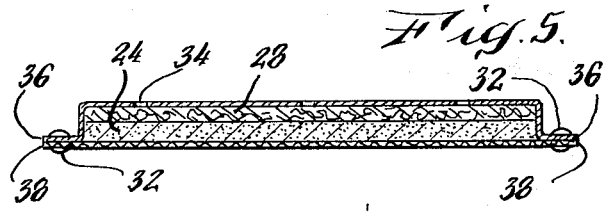
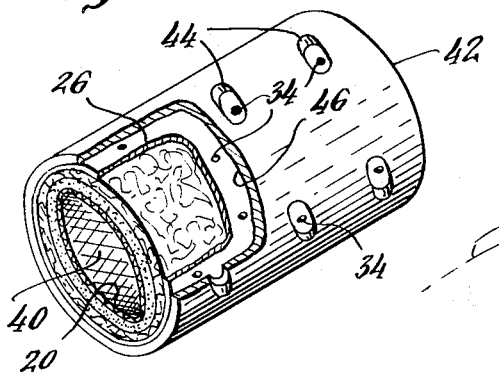
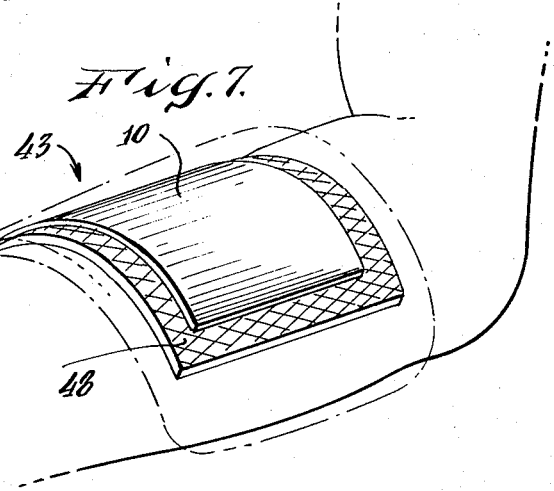
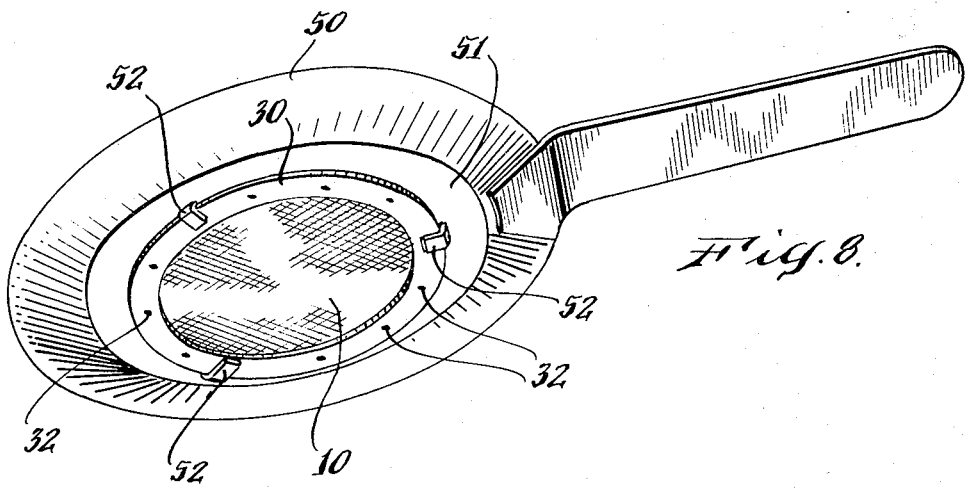

SELF CONTAINED ELECTROCHEMICAL HEAT SOURCE

This invention relates to an electric heat source generally and more specifically to a disposable self contained electrochemical heat source for use in hair waving devices, hot compresses and similar heating applications.

BACKGROUND OF THE INVENTION

Several heat sources for permanent wave setting of hair have been proposed. In one such device an electric current is passed through a resistance wire to heat a closely adjacent tress of hair. Another device employs a solution in place of the resistance wire so that the electric current may heat the solution which vaporizes and thus both heats the tress of hair as well as provide fluid for hair absorbtion. The U.S. Pats. to Durham et al. Nos. 2,118,177 and Gentile, 2,055,099 are illustrative of such so-called "electrolytic" heaters. Disadvantages with such electrolytic heating devices reside in their need for a low voltage power supply and an inherent danger if the low voltage electrodes are inadvertantly shorted.

Still another heating device utilizes the heat generated during a reaction of particular chemical materials. The U.S. Pat. to Pazul No. 2,725,060 is exemplary of this type of heater. As described in the Pazul patent, an aluminum foil is employed in a sandwich pad structure with an absorbant cotton sheet which was impregnated with dry stannous chloride. The structure is enclosed with aluminum foils and is suitably pierced to enable water to be introduced for activation of the pad. The water dissolves the stannous chloride and the solution migrates into contact with the aluminum to initiate a chemical reaction which generates heat. Many other exothermic heating pads have been proposed and utilize different materials; see for example U.S. Pat. Davis et at. No. 2,132,681.

The exothermic type of heating devices have disadvantages such as potential explosions, noxious fumes, toxicity and corrosive materials that may be injurious to persons. Control of the exothermic reactions is more complicated as illustrated by the reaction delaying chemicals described in the Pazul patent.

SUMMARY OF THE INVENTION

In a heating device in accordance with the invention an electrochemical cell such as may be employed in a battery is provided with a substantially integrally contained electrical conductor which is connected between anode and cathode electrodes of the cell to form a direct electrical short circuit. When the cell is activated, it produces an electrochemical reaction which converts chemical energy directly into electrical energy. The short circuit provided by the electrical conductor enables the cell to convert this electrical energy in a highly efficient manner into heat.

The electrochemical heating device of this invention dispenses with the need for external electrical power sources such as are required by electrolytic heaters. In fact, the short circuited construction of the electrochemical heating device provides a self contained structure which is safe to handle and free of voltage hazards. The internal voltage generated by the shorted electrochemical cell functions as a driving force to maintain a generation of heat. Hence, catalytic initiators, often employed in exothermic heating pads, may be dispensed with and the hazards associated with exothermic heaters are advantageously avoided.

An electrochemical heating device in accordance with the invention may be formed of non-toxic materials in a safe structure and may be advantageously stored for long time periods. For example, in one sandwich structure embodiment for an electrochemical heating device a cathode is formed of an activated carbon air electrode and the anode is formed of a metallic foil of aluminum or alloys thereof. A porous non-conductive separator is placed between the anode and cathode and is impregnated with table salt to form a sodium chloride aqueous electrolyte by the simple addition of water. The anode and cathode are electrically shorted to one another by employing metallic fasteners such as a staple applied through the structure to contact both electrodes. An electrical short may also be formed with a strip of the anode foil which is wrapped around the separator to contact the cathode. This electrochemical heater provides a safe and controllable source of heat with relatively inexpensive components.

It is, therefore, an object of this invention to provide a self-contained heating device which may be non-toxic and safe to handle and can be advantageously controlled to provide heat for a wide variety of applications such as permanent hair waving, body heating compresses and the like.

BRIEF DESCRIPTION OF THE DRAWINGS

FIG. 1 is a schematic representation of an electrochemical heating device according to the invention.

FIG. 2 is a perspective underside view of an electrochemical heating device in accordance with the invention.

FIG. 3 is a cross-section of the electrochemical device shown in FIG. 2.

FIG. 4 is a cross-section of an electrochemical heater with another embodiment for a short circuiting element in accordance with the invention.

FIG. 5 is a cross-section of an electrochemical heating device with still another embodiment for a short circuit element in accordance with the invention.

FIG. 6 is a perspective of an electrochemical heating device in accordance with the invention for use as a hair curler.

FIG. 7 is a perspective view of an electrochemical heating device in accordance with the invention for heating of a medical hot compress.

FIG. 8 is a perspective view of an electrochemical heating device in accordance with the invention for heating of a food pan.

DESCRIPTION OF THE EMBODIMENTS

With reference to the schematic illustration of FIG. 1 an electrochemical heating device 10 is shown formed of an anode 12, a separator 14, a cathode 16 and an integrally contained shorting member 18. The anode is an electrochemically oxidizable substance which is electrically conductive and may be made of commonly available metals and their alloys such as for example magnesium, Mg; tin, Sn; aluminum, Al; zinc; Zn; and iron, Fe.

The cathode 16 is an electrochemically reducible substance which is conductive. The cathode need not itself be a reducible substance but may provide an electrochemically active surface upon which another material, e.g. oxygen on an activated carbon air electrode, is reduced. Cathode materials may be formed of a wide variety of substances such as for example manganese dioxide; metadinitrobenzene; silver chloride, AgCl; silver oxide, AgO; copper fluoride; copper chloride and air depolarized cathode structures of the carbon and metal types.

The separator 14 is formed of a non-conductive porous material such as cotton, felt or bibulous papers which enable ions of an electrolyte to freely pass between the anode and cathod.

An electrolyte formed of an ionically conductive medium is placed within the separator 14. The electrolyte may be an aqueous salt solution such as table salt, NaCl or may be selected from a host of many well known other electrolyte materials compatible with the selected anode and cathode materials.

The shorting element 18 is formed of an electrical conductor which is sized to support the short-circuiting current produced when the electrochemical heating device is activated. The shorting element further is integrally contained as part of the structure.

FIGS. 2 and 3 illustrate a sandwich structure cotton an electrochemical heating device 10 in accordance with the invention wherein an activated carbon air electrode 20 is employed as a cathode. The air electrode 20 is formed in a manner that is well known in the art. The air electrode 20 includes a screen 22 which may be formed of a metal such as nickel or iron and serves as a contacting electrode with a layer 24 of activated hydrophobic carbon. A metallic electrically conductive anode foil 26, formed of a chemically non-toxic material such as magnesium, aluminum, zinc or their commercially available alloys, is wrapped around a cottom separator layer 28 to contact the metal screen 22 with peripheral edges 30. Fasteners 32, such as rivets or staples, are employed to secure a connection between the anode 26 and cathode 20. The resulting electrical shorting element is formed by both the overlapping edges 30 and the fasteners 32 which thus also provide a mechanical connection of the parts of the heater.

The separator layer 28 is impregnated with a dry salt such as sodium chloride or alternatively the salt may be dispersed in dry form between the anode and cathode. The anode foil 26 is suitably apertured at a variety of areas 34 to enable water to penetrate the space between the anode and cathode and form a salt electrolyte.

Activation of the electrochemical heater 10 involves the simple step of applying water. As soon as the water has formed an electrolyte solution with the salt an electrochemical cell is formed whose output voltage is determined by the materials employed for the anode and cathode. The shorting path provided by the edges 30 and fasteners 32 then enables the electrical energy to be converted to thermal energy at an efficiency approaching 100 percent.

The thermal power generated is directly proportional to the square of the current and the internal resistance of the cell. One may thus control the current flow by selecting the thickness of the separator 28 and control the thermal power. The current flow also may be controlled by varying the resistance or cross-sectional area of the shorting element. For example, as shown in FIG. 3, the shorting path can be determined solely by the number and types of fasteners 32 (e.g. staples) which electrically interconnect the anode 26 to the cathode 20 without the use of an overlapping edge 30 shown in FIG. 3. Alternatively, a shorting element 18 such as shown in FIG. 5 may be used. In the structure of an electrochemical heater 10 as shown in FIG. 5 a peripheral edge 36 of the anode 26 is brought in registration with a correspondingly shaped edge 38 of the screen 22 and connected together either with a fastener 32 or spotwelds or other convenient means.

In the structure of FIG. 5 the contact of peripheral edges 36 and 38 provide an electrical short circuit of the cell. The electrical shorting conductor may thus be conveniently formed into an integral part of a self contained electrochemical heater and provides an efficient conversion of the chemical energy into heat.

The electrochemical heating device exhibits an advantageous flexibility in that it may be conveniently adapted to a variety of shapes. The thickness of the cell can be reduced to form a flexible structure that can fit in the recess of a hair heat protective cylinder 42 as shown in FIG. 6 or adapt to the contours of a body area for a hot compress 43 as shown in FIG. 7.

The hair heat protective cylinder 42 is formed of a plastic material and is provided with apertures 44 extending into a centrally located recess 40 into which an electrochemical cell such as shown in FIGS. 2 and 3 is placed. The aluminum foil anode electrode 26 is located adjacent to the cylinder wall 46 to enable the air electrode 20 to remain exposed to air. After insertion of the electrochemical heater 10 into recess 40 and submersion into water the heat is transferred through the cylinder wall 46 onto a person's hair that is wrapped around the cylinder to receive a permanent wave. Apertures 44 serve to enable the water electrolyte to provide water for hair absorbtion. After the chemical energy has been dissipated the electrochemical heater 10 may be removed from recess 40 and replaced by another so that the cylinder 42 can be reused.

The hot compress 43 shown in FIG. 7 utilizes a cotton or other suitable water absorbent material 48 which is placed in contact with the body area to be treated (a forearm in FIG. 7). A flexible electrochemical heater 10 is located over the cotton compress 48 which may have been previously wetted. The electrochemical heater also may have been filled with liquid electrolyte or the water for formation of an electrolyte can be absorbed from the wetted cotton compress 48. A suitable string or other fastening device (not shown) may be employed to hold the hot compress 43 in place over the body area to be treated. The water electrolyte advantageously prevents overheating since excessive temperatures would cause a boiling off of the water. The aluminum or aluminum alloy anode and activated carbon depolarized air cathode electrode and table salt electrolyte form a non-toxic safe selfcontained localized heater suitable for such medical purposes.

In the arrangement shown in FIG. 8 an electrochemical heater 10 of enlarged surface area is shown removably mounted to the bottom 51 of a food pan 50. Adjustable clips 52 retain the heater 10 which is of circular shape for adequate heating of the pan 50.

The electrochemical heater 10 shown in FIG. 8 may be such as shown in FIG. 2 and 3 with an overlapping anode edge 30. The anode electrode is placed adjacent to the bottom 51 of the pan 50 while the air cathode electrode 20 is exposed to air even when the pan 50 rests on clips 52. After the heater 10 is mounted to the pan, the latter's bottom 51 is quickly dipped into water to wet the electrochemical heater 10 which is then activated to commence heating of the pan 50 and food placed therein.

The electrochemical heater as thus described may take a variety of forms. For example the electrochemical heater may be formed in an enclosed structure which includes an anode and a cathode and a liquid electrolyte. The anode and cathode may be externally accessible for connection to a separate shorting member. When the shorting member is connected in contact between the anode and cathode electrochemical heating is commenced in the manner as described with respect to the previous embodiments.

Having thus described an electrochemical heater its many advantages may be appreciated. It may be formed of non-toxic non-hazardous materials suitable for heating applications in medical or food related fields. The electrochemical heater may be stored for long time periods and can be readily activated by the simple addition of water where a dry electrolyte material is enclosed. The aluminum or aluminum alloy foil anode and air cathode electrochemical heater may be activated with table salt solution. The electrochemical heater may be controlled by sizing as desired. For example, in a thin sandwich structure form the heater can be cut with scissors to a desired size and shape. The amount of heat produced can be controlled by limiting the quantity of water supplied to the porous separator. A wide variety of materials may be employed in selecting a desired electrochemical heater.

What is claimed is:

1. A self contained electrochemical heat source without electrical terminals comprising
an electrochemical cell structure formed of a generally thin electrically conductive first member made of an electrochemically active oxidizable material and a generally thin electrically conductive second member made of an electrochemically active non-metallic reducible material, said first and second members having material for forming an ionically conductive electrolyte located therebetween, said first and second members being further selected for forming an electric heating current producing electrochemical couple capable upon electrical interconnection of the members of heating the electrochemical cell structure to a temperature which is sufficiently high for forming said self-contained heat source; and
a multiple of discrete electronically conductive elements extending between the electrochemically active oxidizable first member and the electromechanically active reducible second member for electrical contact therewith, said electronically conductive elements being spaced and selected to conduct an electric heating current between the first oxidizable member and the second reducible member for a uniform heating of the electrochemical cell structure during activation of the electrochemical cell.

2. An electrical heating source comprising
a sandwich shaped thin electrochemical cell structure including an anode and a cathode said anode being formed of a foil shaped material selected from the group consisting of aluminum, aluminum alloys, magnesium and magnesium alloys, said cathode being formed of an activated carbon depolarized air electrode, a non-conductive separator located between the anode and cathode;
a multiple of discrete electrically conductive metal fastening elements pierced through the anode and cathode and electrically connected thereto to form a mechanically integral electrochemical cell structure;
said metal fastening elements being spaced from each other and selectively sized to further provide a desired conversion rate of electrochemical energy into heat upon electrolyte activation of the cell structure.

3. The electric heating source as claimed in claim 2 wherein said electrochemical cell further includes an electrolyte material formed of table salt to provide an ionizable table salt electrolyte upon the addition of water to the electrochemical cell.

4. The electrochemical heat source as claimed in claim 1 wherein the electronically conductive elements are in the form of mechanical metal fasteners extending through the oxidizable first member and the reducible second member to fasten hereto and retain the electrochemical cell into a thin sandwich shaped structure.

5. The electrochemical heat source as claimed in claim 1 wherein the electronically conductive elements are metallic conductors extending through the first and second members to electrically connect thereto and form a corresponding number of generally uniformly distributed discrete shorting points between the first and second members for a uniform heating of the electrochemical cell structure.

6. A self contained electrochemical heating source comprising an electrochemical cell structure formed of a generally thin electrically conductive first member made of an electrochemically active oxidizable material and a generally thin electrically conductive second member made of an electrochemically active non-metallic reducible material, said first and second members being selected to provide a substantial electrochemical driving voltage to convert electrochemical energy to heat, said first and second members being further selected for forming an electric heating current producing electrochemical couple capable upon electrical interconnection of the members of heating the electrochemical cell structure to a temperature which is sufficiently high for forming said self-contained heat source, a porous non-conductive separator interposed between the first and second members and formed of a material selected to retain an electrolyte, a plurality of discrete electronically conductive elements in contact with the first and second members for electrical contact therewith, said elements being spaced and selected to conduct a controlled electric heating current between the first oxidizable member and the second reducible member upon the introduction of an electrolyte into the porous separator to enable an electric heating of the sandwich structure.

7. The electrochemical heating source as claimed in claim 6 wherein the discrete electronically conductive elements are structured to mechanically fasten the first and second members into a thin sandwich shaped structure.

8. The electrochemical heating source as claimed in claim 7 wherein said first and second conductive members are formed with conductive peripheral segments extending outwardly from the porous separator, and with discrete electrically conductive elements being located to extend through said extending peripheral segments.

9. The electrochemical heating source as claimed in claim 6 wherein said elements are formed of electrically conductive metal fasteners operatively applied through said first and second members and said separator to retain the sandwich structure relationship and provide said electrical heating.

10. The electrochemical heating source as claimed in claim 6 wherein said discrete elements are metal staples extending through the first and second conducting members.

* * * * *

Disclaimer and Dedication

3,774,589.—*Frederick P. Kober,*Bayside, N.Y. SELF CONTAINED ELECTRO-
CHEMICAL HEAT SOURCE. Patent dated Nov. 27, 1973. Disclaim-
er and Dedication filed June 23, 1983, by the assignee, *Chem-E-Watt
Corp.*

Hereby disclaims and dedicates to the Public the remaining term of said patent.
[*Official Gazette January 8, 1985.*]